US012633127B2

(12) United States Patent
Mizukoshi

(10) Patent No.: US 12,633,127 B2
(45) Date of Patent: May 19, 2026

(54) CONTROL APPARATUS, MONITORING SYSTEM, CONTROL METHOD, AND NON-TRANSITORY COMPUTER-READABLE MEDIUM

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/841,421

(22) PCT Filed: Mar. 8, 2022

(86) PCT No.: PCT/JP2022/009840
§ 371 (c)(1),
(2) Date: Aug. 26, 2024

(87) PCT Pub. No.: WO2023/170768
PCT Pub. Date: Sep. 14, 2023

(65) Prior Publication Data
US 2025/0166390 A1 May 22, 2025

(51) Int. Cl.
*G06V 20/56* (2022.01)
*G06V 20/40* (2022.01)

(52) U.S. Cl.
CPC .............. *G06V 20/56* (2022.01); *G06V 20/44* (2022.01)

(58) Field of Classification Search
CPC ................................ G06V 20/56; G06V 20/44
See application file for complete search history.

(56) References Cited

U.S. PATENT DOCUMENTS

| | | | | |
|---|---|---|---|---|
| 11,823,564 B1* | 11/2023 | Wittevrongel | ....... | G08G 1/0112 |
| 2017/0341611 A1* | 11/2017 | Baker | ..................... | B60R 21/16 |
| 2023/0169862 A1* | 6/2023 | Tsubaki | ................. | G06V 20/58 |

FOREIGN PATENT DOCUMENTS

| | | |
|---|---|---|
| JP | 2004-280696 A | 10/2004 |
| JP | 2006-135824 A | 5/2006 |
| JP | 2009-169540 A | 7/2009 |
| JP | 2009-294882 A | 12/2009 |

(Continued)

OTHER PUBLICATIONS

International Search Report for PCT Application No. PCT/JP2022/009840, mailed on May 24, 2022.

(Continued)

*Primary Examiner* — Rebecca A Volentine

(74) *Attorney, Agent, or Firm* — Sughrue Mion, PLLC

(57) ABSTRACT

A control apparatus according to one aspect of the present example embodiment includes: at least one memory storing instructions; and at least one processor configured to execute the instructions to: detect, based on environment information transmitted from a plurality of information acquisition apparatuses that acquires the environment information, whether or not a notable event, which is an event to be noted, has occurred around any of the information acquisition apparatuses; and output, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

12 Claims, 11 Drawing Sheets

(56)  References Cited

FOREIGN PATENT DOCUMENTS

| | | |
|---|---|---|
| JP | 2015-211302 A | 11/2015 |
| JP | 2018-152786 A | 9/2018 |
| JP | 2019-512913 A | 5/2019 |
| JP | 2021-002283 A | 1/2021 |
| WO | 2021/199349 A1 | 10/2021 |
| WO | 2021/210134 A1 | 10/2021 |

OTHER PUBLICATIONS

JP Office Action for JP Application No. 2024-505684, mailed on May 27, 2025 with English Translation.

* cited by examiner

| SETTING EXAMPLE | FOR AI | FOR SURVEILLANCE STAFF |
|---|---|---|
| FRAME RATE [fps] | 10 | 30 |
| BIT RATE [Mbps] | 0.5 | 5 |
| RESOLUTION | HD | Full HD |

Fig. 9A

| SETTING EXAMPLE | FOR AI | FOR DETAILED AI ANALYSIS | FOR SURVEILLANCE STAFF |
|---|---|---|---|
| FRAME RATE [fps] | 10 | 15 | 30 |
| BIT RATE [Mbps] | 0.5 | 2 | 5 |
| RESOLUTION | HD | Full HD | Full HD |

Fig. 9B

| SETTING EXAMPLE | FOR AI | FOR SURVEILLANCE STAFF |
|---|---|---|
| GPS [Hz] | 0.2 | 10 |
| SOUND [bps] | 32k | 192k |
| CAN [Hz] | 1 | 100 |

Fig. 10

| SETTING EXAMPLE | 0 SECONDS | AFTER 2 SECONDS | AFTER 4 SECONDS | AFTER 6 SECONDS | AFTER 8 SECONDS | AFTER 10 SECONDS |
|---|---|---|---|---|---|---|
| BIT RATE [Mbps] | 5 | 4 | 3 | 2 | 1 | 0.5 |

Fig. 11

CONTROL APPARATUS, MONITORING SYSTEM, CONTROL METHOD, AND NON-TRANSITORY COMPUTER-READABLE MEDIUM

This application is a National Stage Entry of PCT/JP2022/009840 filed on Mar. 8, 2022, the contents of all of which are incorporated herein by reference, in their entirety.

TECHNICAL FIELD

The present invention relates to a control apparatus, a monitoring system, a control method, and a non-transitory computer-readable medium.

BACKGROUND ART

In recent years, in the fields of automated driving of a vehicle, management of an operation state of a factory, and the like, a remote monitoring technology has been developed.

For example, Patent Literature 1 describes that a remote control apparatus receives an inside video of a vehicle, predicts a risk of occurrence of an accident in the vehicle based on the inside video and situation information indicating a situation of the vehicle, and adjusts quality of the inside video based on a prediction result.

Further, Patent Literature 2 describes that an external apparatus determines whether or not a driver has a predetermined symptom based on an inside video of a vehicle, and in a case where the driver has the predetermined symptom, the inside video is enhanced to high quality to clearly record a state of the driver.

Further, Patent Literature 3 describes that a pitch of a variable pitch camera attached to an autonomous vehicle is changed to maximize definition and/or resolution of an image of the camera as the autonomous vehicle moves.

CITATION LIST

Patent Literature

Patent Literature 1: International Patent Publication No. WO2021/199349
Patent Literature 2: Japanese Unexamined Patent Application Publication No. 2021-002283
Patent Literature 3: Published Japanese Translation of PCT International Publication for Patent Application, No. 2019-512913

SUMMARY OF INVENTION

Technical Problem

In a case where quality of data such as a video obtained by capturing an image of a monitoring target is low, accuracy of remote monitoring is low. However, in a case where data such as a video has high quality, there is a problem that a data communication amount required for remote monitoring increases.

An object of the present disclosure is to provide a control apparatus, a monitoring system, a control method, and a non-transitory computer-readable medium that can achieve both improvement in accuracy of remote monitoring and adjustment of a data communication amount required for remote monitoring.

Solution to Problem

A control apparatus according to one aspect of the present example embodiment includes: at least one memory storing instructions; and at least one processor configured to execute the instructions to: detect, based on environment information transmitted from a plurality of information acquisition apparatuses that acquires the environment information, whether or not a notable event, which is an event to be noted, has occurred around any of the information acquisition apparatuses; and output, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

A monitoring system according to one aspect of the present example embodiment includes: a plurality of information acquisition apparatuses configured to acquire environment information and transmit the acquired environment information; and a control apparatus configured to control the transmission of the environment information of the plurality of information acquisition apparatuses based on the environment information transmitted from the plurality of information acquisition apparatuses, in which the control apparatus includes: at least one memory storing instructions; and at least one processor configured to execute the instructions to: detect, based on the environment information transmitted from the plurality of information acquisition apparatuses, whether or not a notable event, which is an event to be noted, has occurred around any of the information acquisition apparatuses; and output, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

A control method according to one aspect of the present example embodiment is executed by a control apparatus, the control method including: detecting, based on environment information transmitted from a plurality of information acquisition apparatuses that acquires the environment information, whether or not a notable event, which is an event to be noted, has occurred around any of the information acquisition apparatuses; and outputting, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

A non-transitory computer-readable medium stores a program according to one aspect of the present example embodiment, in which the program causes a computer to perform: detecting, based on environment information transmitted from a plurality of information acquisition apparatuses that acquires the environment information, whether or not a notable event, which is an event to be noted, has occurred around any of the information acquisition apparatuses; and outputting, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

Advantageous Effects of Invention

According to the present disclosure, it is possible to provide a control apparatus, a monitoring system, a control method, and a non-transitory computer-readable medium that can achieve both improvement in accuracy of remote monitoring and adjustment of a data communication amount required for remote monitoring.

BRIEF DESCRIPTION OF DRAWINGS

FIG. 9A is a table illustrating examples of video quality (for artificial intelligence (AI)) when an alert has not occurred and video quality (for a surveillance staff) when an alert has occurred.

FIG. 9B is a table illustrating examples of video quality (for AI) when an alert has not occurred and video quality (for detailed AI analysis and for the surveillance staff) when an alert has occurred.

FIG. 10 is a table illustrating examples of quality (for AI) when an alert has not occurred and quality (for the surveillance staff) when an alert has occurred for environment information.

FIG. 11 is a table illustrating an example in which a bit rate of a video transmitted by an alert determination unit is increased to a bit rate for the surveillance staff and then decreased again to a bit rate for AI.

EXAMPLE EMBODIMENT

Hereinafter, the present disclosure will be described with reference to the drawings. Note that in the description and drawings to be described below, omission and simplification are made as appropriate, for clarity of description. Further, in the present disclosure, unless otherwise specified, in a case in which "at least one" is defined for a plurality of items, the definition may mean any one item or may mean any two or more items (including all items).

Example Embodiment 1

Example Embodiment 1A

In Example Embodiment 1A, a control apparatus that detects occurrence of a notable event which is an event to be noted will be described.

Figure 1:
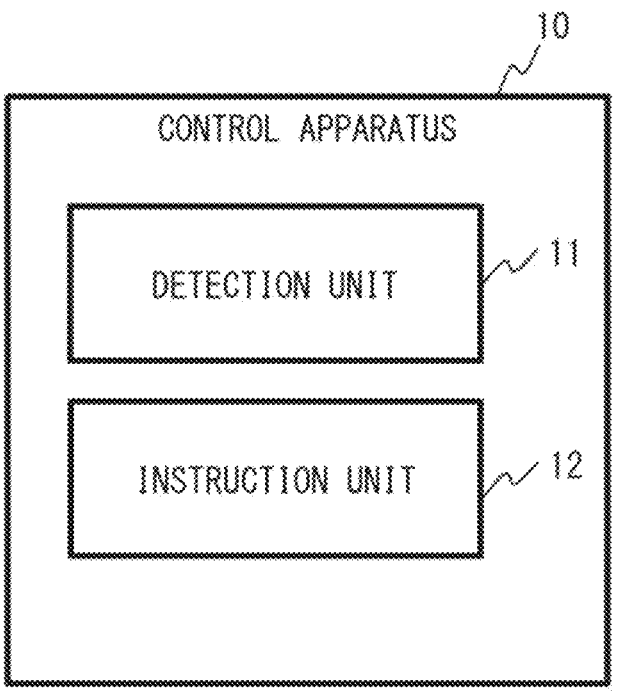
FIG. 1 is a block diagram illustrating an example of a control apparatus according to Example Embodiment 1.

FIG. 1 is a block diagram illustrating an example of the control apparatus. A control apparatus 10 includes a detection unit 11 and an instruction unit 12. Each unit (each unit) of the control apparatus 10 is controlled by a control unit (controller) (not illustrated) reading a program. Hereinafter, each component will be described.

The detection unit 11 detects whether or not the notable event, which is an event to be noted, has occurred around any of a plurality of information acquisition apparatuses that acquires environment information based on the environment information transmitted from the information acquisition apparatuses. Here, the "information acquisition apparatus" is an apparatus that can acquire arbitrary information regarding a surrounding environment in which the apparatus is provided, such as a camera that captures a still image or a moving image, a sensor capable of detecting its own position, such as a satellite positioning system (for example, a global positioning system (GPS)) sensor, a microphone, a controller area network (CAN) sensor mounted on a vehicle, or a vibration detection sensor. The "environment information" is information acquired by the information acquisition apparatus, and is, for example, information such as video information, position information, sound information, vehicle state information, or vibration information. The pieces of environment information acquired by the detection unit 11 from the plurality of information acquisition apparatuses may be the same type of information or may be different pieces of information. For example, any of the plurality of information acquisition apparatuses may transmit the video information. In another example, one information acquisition apparatus may transmit the video information, while another information acquisition apparatus may transmit the sound information.

Further, the plurality of information acquisition apparatuses may be provided in the same detection target (for example, the vehicle) or may be provided in different places. Furthermore, a position where the information acquisition apparatus is provided may be fixed, or the information acquisition apparatus may be provided on a movable object such as the vehicle. Details of such variations are described below in Example Embodiment 2 and subsequent example embodiments.

The detection unit 11 determines that, for example, an accident has occurred or a possibility of an accident occurring in the near future is a predetermined threshold value or more, as the notable event which is an event to be noted. Specifically, in a case where a certain information acquisition apparatus is mounted on the vehicle and captures a video in a traveling direction of the vehicle, the detection unit 11 detects, by determination, that the vehicle has come in contact with an object in the traveling direction (for example, another vehicle) or that the vehicle is to come in contact with the object within a predetermined time based on the image. The determination may be performed by, for example, an artificial intelligence (AI) model subjected to machine learning, or may be performed by an arbitrary analysis method such as image analysis. At this time, for example, at least one of factors such as properties of the object such as a size, a shape, and a material of the object, a distance between the information acquisition apparatus and the object, speeds of the information acquisition apparatus and the object, a positional relationship between the information acquisition apparatus and the object, and the traveling direction may be detected based on the environment information acquired by one or a plurality of information acquisition apparatuses. The detected factor can be used to determine the presence or absence of the notable event by the AI model or the like.

As another example, the detection unit 11 may detect rapid acceleration/deceleration of the vehicle on which the information acquisition apparatus is mounted based on the position information or the vehicle state information, the acceleration/deceleration being equal to or more than a predetermined threshold value, or may detect a collision or acceleration/deceleration of the vehicle on which the information acquisition apparatus is mounted based on the sound information or the vibration information. The detection unit 11 detects, based on such a detection result, whether or not the notable event has occurred.

In a case where the detection unit 11 has detected the occurrence of the notable event, the instruction unit 12 outputs an instruction to a first information acquisition apparatus to change quality of the environment information transmitted by the first information acquisition apparatus that has transmitted the environment information not related to the detection of the occurrence of the notable event. The "first information acquisition apparatus" refers to an apparatus that acquires the environment information not related to the detection of the occurrence of the notable event by the detection unit 11. For example, the detection unit 11 does not have to be able to detect the occurrence of the notable event from the acquired environment information of the first information acquisition apparatus. As a specific example, in a case where another vehicle is parked in front of the vehicle on which the plurality of information acquisition apparatuses is mounted and the detection unit 11 has detected the occurrence of the notable event from a video transmitted from an information acquisition apparatus that captures an image of the front of the vehicle, an information acquisition apparatus that captures an image of an area other than the front of the vehicle can correspond to the "first information acquisition apparatus". Alternatively, in a case where the plurality of information acquisition apparatuses is fixed outdoors and it is detected that the notable event has occurred based on a video from a certain information acquisition apparatus, an information acquisition apparatus that does not capture an image of a region where the notable event has occurred also corresponds to the "first information acquisition apparatus". The "first information acquisition apparatus" may be any of one or a plurality of information acquisition apparatuses.

Here, the instruction unit 12 may cause the first information acquisition apparatus to enhance or lower the quality of the environment information transmitted by the apparatus. Enhancing the quality means, for example, enhancing image quality of a video when the environment information is the video. Enhancing the image quality may mean, for example, increasing at least one of a frame rate, a bit rate, or resolution of the video. Lowering the image quality has the opposite meaning. Further, enhancing the quality of the environment information may mean increasing a transmission frequency if the environment information is any one of the position information, the sound information, the vehicle state information, and the vibration information. Lowering the quality of the environment information has the opposite meaning.

Such a change in quality of the environment information is made, whereby a data amount of the transmitted environment information is changed. In a case where the quality of the environment information is high, the data amount is large, and in a case where the quality of the environment information is low, the data amount is small. When the quality of the environment information is enhanced, the data amount is increased, cost for communication between the control apparatus 10 and the information acquisition apparatus increases, but accuracy of remote monitoring can be improved. On the other hand, when the quality of the environment information is lowered, the accuracy of remote monitoring is decreased, but the data amount is decreased, so that the cost for communication can be reduced.

Figure 2:
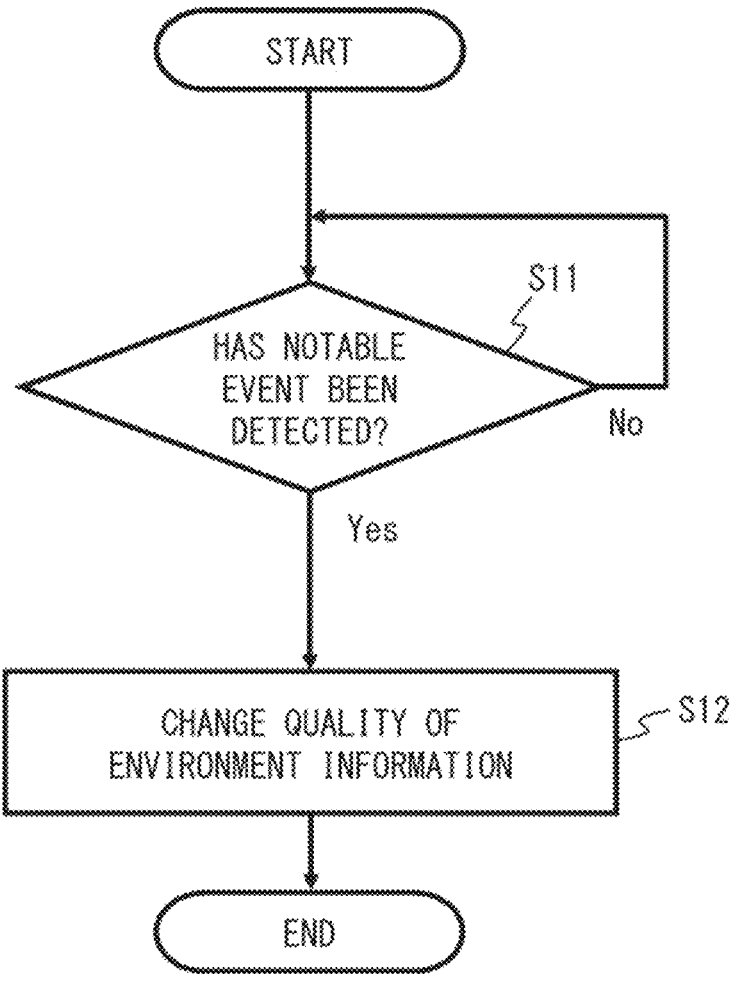
FIG. 2 is a flowchart illustrating an example of processing executed by the control apparatus according to Example Embodiment 1.

FIG. 2 is a flowchart illustrating an example of representative processing in the control apparatus 10, and processing of a control method executed by the control apparatus 10 will be described with the flowchart. The details of processing executed by each unit below are as described above.

The detection unit 11 detects whether or not the notable event, which is an event to be noted, has occurred around any of the plurality of information acquisition apparatuses based on the environment information transmitted from the information acquisition apparatuses (step S11 (detection step)). In a case where the occurrence of the notable event is not detected (No in step S11), the detection unit 11 intermittently performs the determination in step S11 again.

In a case where the detection unit 11 detects that the notable event has occurred (Yes in step S11), the instruction unit 12 outputs an instruction to change the quality of the transmitted environment information, to the first information acquisition apparatus that has transmitted the environment information not related to the detection of the occurrence of the notable event (step S12 (instruction step)).

As described above, in a case where it is detected that the notable event has occurred, the control apparatus 10 can cause the first information acquisition apparatus that has transmitted the environment information not related to the detection of the occurrence of the notable event to change the quality of the transmitted environment information. Therefore, it is possible to improve the accuracy of remote monitoring and adjust a data communication amount required for the remote monitoring.

The control apparatus 10 may have a centralized configuration including a single computer, or may have a distributed configuration in which a plurality of computers shares and executes the processing of the detection unit 11 and the processing of the instruction unit 12. In the distributed configuration, a plurality of devices may be connected via a communication network such as a local area network (LAN), a wide area network (WAN), or the Internet.

Example Embodiment 1B

Next, in Example Embodiment 1B, a monitoring system will be described.

Figure 3:
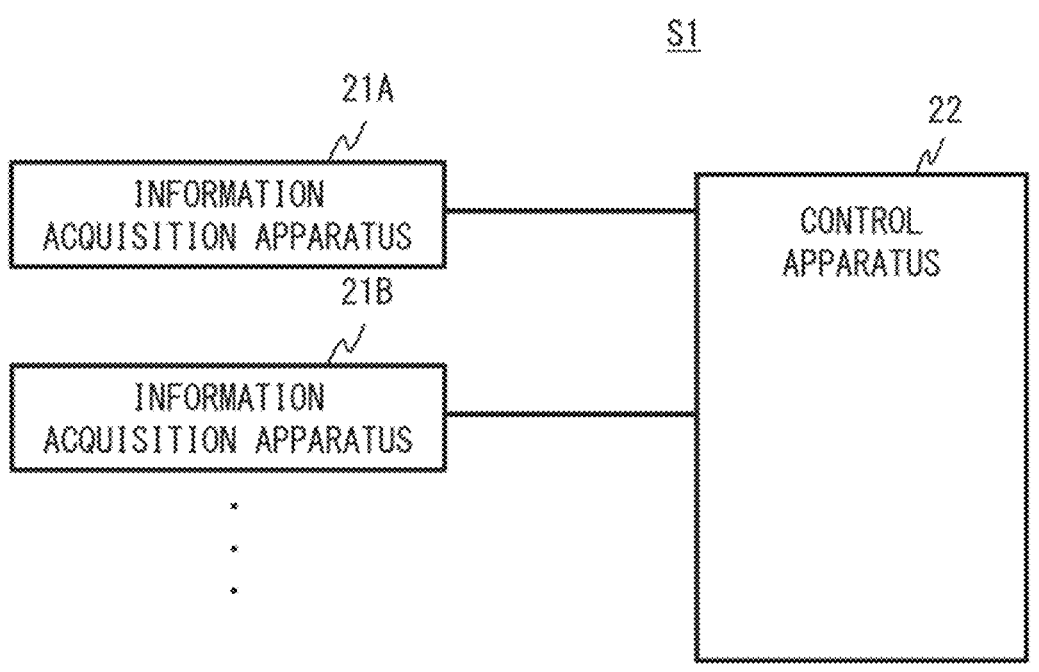
FIG. 3 is a block diagram illustrating an example of a monitoring system according to Example Embodiment 1.

FIG. 3 is a block diagram illustrating an example of a monitoring system. A monitoring system S1 includes a plurality of information acquisition apparatuses 21A, 21B, and the like and a control apparatus 22. Each information acquisition apparatus 21 acquires surrounding environment information, and transmits the acquired environment information to the control apparatus 22. Details of information acquisition apparatus 21 are as described in Example Embodiment 1A. In addition, the control apparatus 22 controls transmission of the environment information by the plurality of information acquisition apparatuses 21 based on the environment information transmitted from each information acquisition apparatus 21.

The control apparatus 22 corresponds to the control apparatus 10 in Example Embodiment 1A. Specifically, the control apparatus 22 includes a detection unit 11 that detects whether or not a notable event has occurred around any of the information acquisition apparatuses 21 based on the environment information transmitted from the information acquisition apparatus 21, and an instruction unit 12 that outputs an instruction to the first information acquisition apparatus 21 to change quality of the environment information transmitted by the information acquisition apparatus 21 (first information acquisition apparatus) that has transmitted the environment information not related to the detection of the occurrence of the notable event in a case where the detection unit 11 has detected the occurrence of the notable event. A detailed description of each unit is also as described in Example Embodiment 1A.

As described above, also in the monitoring system, it is possible to cause the first information acquisition apparatus that has transmitted the environment information not related to the detection of the occurrence of the notable event to change the quality of the transmitted environment information, in a case where it is detected that the notable event has occurred. Therefore, it is possible to improve the accuracy of remote monitoring and adjust a data communication amount required for the remote monitoring.

Example Embodiment 2

Hereinafter, specific example embodiments will be described with reference to the drawings.

Figure 4:
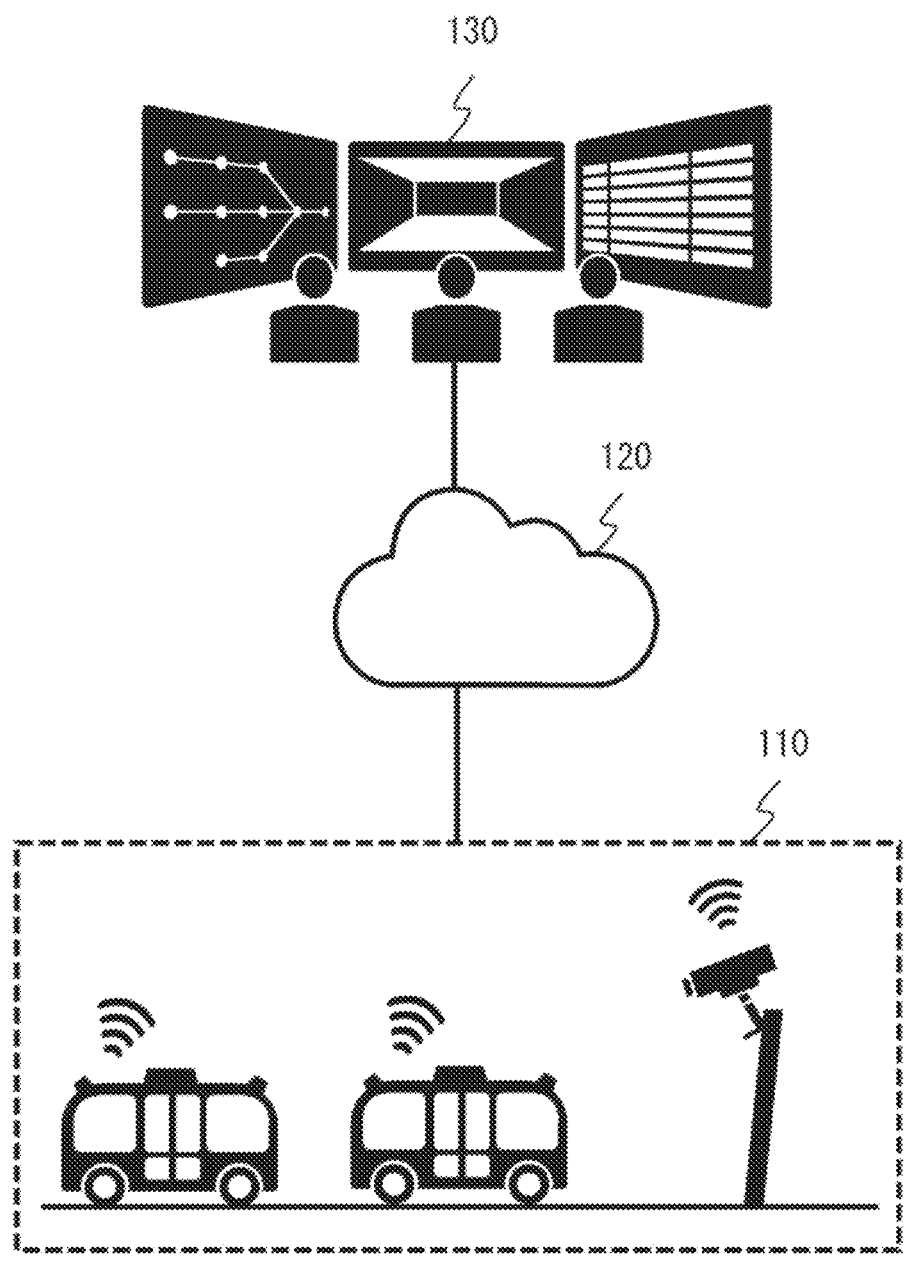
FIG. 4 is a block diagram illustrating an example of a monitoring system according to Example Embodiment 2.

FIG. 4 is a block diagram illustrating an example of a monitoring system. A monitoring system S2 is a system that includes an on-site system 110, a cloud 120, and a display system 130 and executes remote monitoring of a vehicle or the like. The on-site system 110 and the cloud 120, and the cloud 120 and the display system 130 are connected by a wireless line such as long term evolution (LTE), fifth generation (5G), or a wireless local area network (LAN) or a wired line, and transmit and receive data via the line. Details of each unit will be described below.

Figure 5:
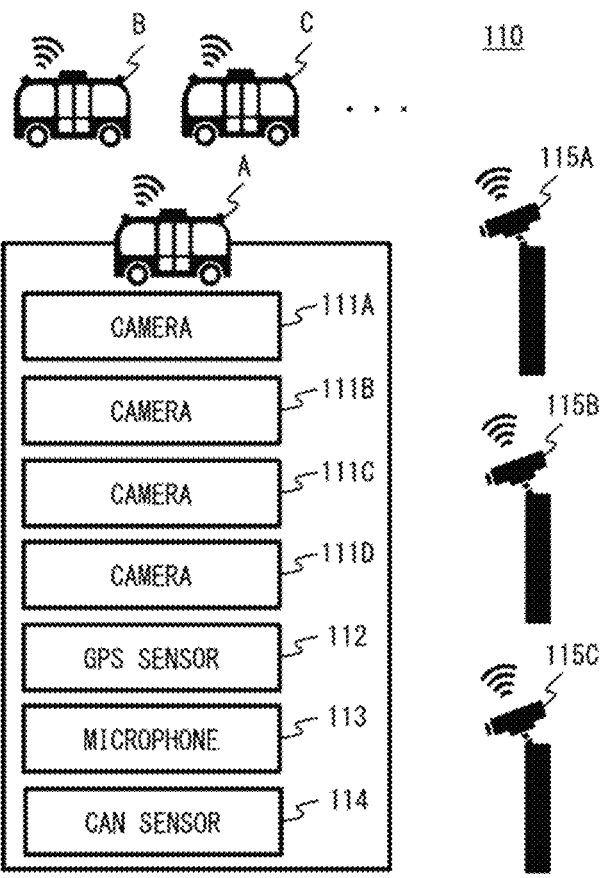
FIG. 5 is a block diagram illustrating an example of an on-site system according to Example Embodiment 2.

FIG. 5 is a block diagram illustrating an example of the on-site system 110. The on-site system 110 includes cameras 111A to 111D, a GPS sensor 112, a microphone 113, a CAN sensor 114, and infrastructure cameras 115A to 115C. The apparatuses each transmit a video seen from the vehicle, position information, sound information, or a video obtained by capturing an outdoor image as environment information to a control system 200 via a wireless network. Here, the cameras 111A to 111D, the GPS sensor 112, the microphone 113, and the CAN sensor 114 are mounted on a vehicle A, and function as control apparatuses of the vehicle A. Here, an automobile capable of automated driving is assumed as the vehicle, but the present disclosure can also be applied to any vehicle such as a vehicle other than an automobile capable of automated driving, a motorcycle, a bicycle, or a railway vehicle. Further, the present disclosure can be applied not only to a vehicle but also to any mobile object other than a vehicle, such as a flying object or a ship. The cameras 111A to 111D and the infrastructure cameras 115A to 115C may also be collectively referred to as cameras 111 and infrastructure cameras 115.

The cameras 111A, 111B, 111C, and 111D are provided outside the vehicle A, and capture images of the front, rear, right, and left sides of the vehicle A as moving images, respectively. As a camera is also provided in the vehicle A, an inside video of the vehicle may be captured in the same manner. The GPS sensor 112 acquires the position information of the vehicle A by using a GPS function. The microphone 113 acquires the sound information around the vehicle A. The CAN sensor 114 is connected to a control system of vehicle A, and acquires vehicle state information indicating a traveling state of the vehicle A, the presence or absence of a failure, and the like. The apparatuses transmit the acquired environment information to the cloud 120, and change, when a control signal related to transmission of the environment information is received from the cloud 120, an environment information transmission method based on the control signal. This will be described below in detail.

In addition, the cameras 111, the CAN sensor 114, and the like are mounted not only on the vehicle A but also on vehicles B, C, and the like similarly to the vehicle A. The apparatuses also transmit the environment information acquired by each apparatus to the cloud 120, and in a case where a control signal is received from the cloud 120, the environment information transmission method is changed based on the control signal.

The infrastructure cameras 115 are cameras of which positions are fixed and which are provided at different places outdoors and can capture images of different regions. As an example, the infrastructure camera 115 is provided at a place where the vehicle can travel (for example, a place where an accident is likely to occur), such as a road, a traffic light, a roadside unit, an intersection, or a railroad crossing, and can capture an image of the surrounding region. The infrastructure camera 115 not only transmits a captured video to the cloud 120, but also changes, when a control signal related to transmission of the environment information is received from the cloud 120, the transmission method of the environment information based on the control signal.

Figure 6:
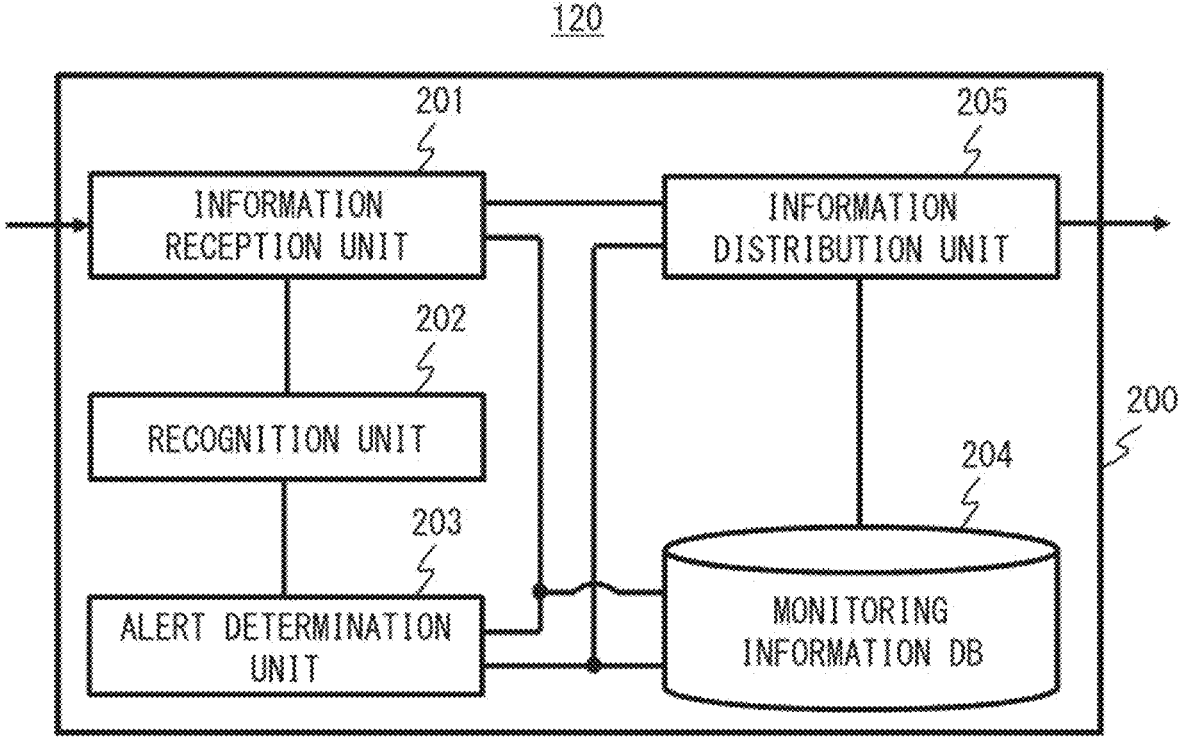
FIG. 6 is a block diagram illustrating an example of a cloud according to Example Embodiment 2.

FIG. 6 is a block diagram illustrating an example of the cloud 120. The cloud 120 relays the environment information from the on-site system 110 and distributes the environment information to the display system 130, and includes the control system 200 having a function of generating an alert indicating that an alert event (corresponding to the notable event in Example Embodiment 1) has occurred in the vehicle. The control system 200 corresponds to the control apparatus 10 in Example Embodiment 1, and includes an information reception unit 201, a recognition unit 202, an alert determination unit 203, a monitoring information database (DB) 204, and an information distribution unit 205. Here, the control system 200 may have a centralized configuration including a single computer, or may have a distributed configuration in which a plurality of computers shares and executes processing of the information reception unit 201 to processing of the information distribution unit 205. In the distributed configuration, a plurality of devices may be connected via a communication network such as a LAN, a WAN, or the Internet. Similarly, the entire cloud 120 may have a centralized configuration including a single computer or may have a distributed configuration including a plurality of computers. Details of the information reception unit 201 to the information distribution unit 205 will be described below.

The information reception unit 201 receives the environment information transmitted from each apparatus provided in the on-site system 110. The information reception unit 201 outputs the received environment information to other units of the control system 200.

The recognition unit 202 (recognition engine) identifies, based on the environment information acquired from the information reception unit 201, a region of an object appearing in videos captured by each camera 111 and each infrastructure camera 115, and specifies (recognizes) the object present in the region. For example, the recognition unit 202 can recognize whether the object appearing in the video is a person, a vehicle, a utility pole, or other obstacles. Furthermore, the recognition unit 202 estimates a posture of the object such as a person appearing in the video by identifying a feature point of the object. Here, the recognition unit 202 can execute recognition processing for the vehicle A by using at least one of the video captured by the camera 111 of the vehicle A or the video of the vehicle A captured by the infrastructure camera 115 from the outside.

Furthermore, the recognition unit 202 can estimate, based on the video, a distance between the object appearing in the video and the camera 111 or the infrastructure camera 115 that has captured the video. Furthermore, the recognition unit 202 can also recognize a traveling lane of a road on which the vehicle on which the camera 111 that has captured the video is mounted travels.

The recognition unit 202 executes the above processing and outputs the processing result (object recognition result) to the monitoring information DB 204. In this example, the recognition unit 202 specifies an object in a video, estimates a posture, estimates a distance, and recognizes a traveling lane by using an AI model subjected to machine learning in advance. However, other analysis methods may be used for the above processing. Furthermore, not only the videos from the camera 111 and the infrastructure camera 115 but also the sound information, the position information, the vehicle state information, and the like may be further used for the above recognition processing.

The alert determination unit 203 corresponds to the detection unit 11 and the instruction unit 12 according to Example Embodiment 1, and when the object recognition result and the environment information are acquired, the alert determination unit 203 determines whether or not the alert event has occurred in at least one of the vehicles A, B, C, and the like based on the data. Then, in a case where it is determined that the alert event has occurred in any of the vehicles, alert information regarding the vehicle is output to the monitoring information DB 204 and the information distribution unit 205. In the example described below, the alert determination unit 203 determines the presence or absence of an alert by using the AI model subjected to machine learning in advance, but another analysis method may be used for the determination.

For example, it is assumed that the recognition unit 202 has recognized that another vehicle is stopped within a predetermined distance from the vehicle A in front of the vehicle A in a traveling direction based on the video captured by the camera 111A of the vehicle A. The alert determination unit 203 determines whether or not the vehicle A is approaching the stopped vehicle by inputting the environment information to the AI model for determination based on the recognition result. Then, in a case where the vehicle A is approaching, it is determined that there is an alert event that the vehicle A may collide with the another vehicle. Then, an alert flag for the vehicle A is set from "No" to "Yes", and the alert information is output to the monitoring information DB 204 and the information distribution unit 205. Similarly to the recognition processing, the determination can be made using at least one of the video captured by the camera 111 of the vehicle A or the video of the vehicle A captured by the infrastructure camera 115 from the outside.

Furthermore, as another example, it is assumed that the recognition unit 202 has recognized that a passenger standing inside the vehicle A that is a bus has lost his/her posture and has fallen down based on a video captured by a camera provided inside the vehicle A. The alert determination unit 203 determines that there is an alert event that there is a possibility that the vehicle A has suddenly stopped in a case where it is determined that the vehicle A has decelerated at a predetermined acceleration or more, by inputting the environment information to the AI model for determination based on the recognition result. Then, the alert flag for the vehicle A is set from "No" to "Yes", and the alert information is output to the monitoring information DB 204 and the information distribution unit 205.

In the above determination processing, not only the videos from the camera 111 and the infrastructure camera 115 but also the sound information, the position information, the vehicle state information, and the like may be further used. For example, it may be determined that the vehicle A has decelerated at the predetermined acceleration or more based on the information regarding the traveling state of the vehicle A acquired by the CAN sensor 114.

In addition, the alert determination unit 203 may specify a region (a partial region in the video) related to the occurrence of the alert event in the video captured by the camera as a region of interest for monitoring, and include, in the alert information, information regarding the region of interest. In the above example, in a case where the vehicle A is approaching the stopped vehicle, the alert determination unit 203 specifies a region in which the preceding vehicle appears in the video captured by the camera 111A as the region of interest. In this case, since a building around the road on which the vehicle A travels is not a region important for monitoring, the building does not have to be included in the region of interest. In addition, in a case where a passenger standing inside the vehicle A has fallen down, the alert determination unit 203 specifies a region in which the fallen passenger appears as the region of interest in a video captured by a camera provided inside the vehicle A.

Further, when the alert event occurs in any vehicle, the alert determination unit 203 can also output a control signal for performing control to change the quality of the transmitted environment information to an arbitrary apparatus of the on-site system 110. This will be described below in detail.

The monitoring information DB 204 stores the environment information received by the information reception unit 201 and the alert information determined by the alert determination unit 203. The information stored in the monitoring information DB 204 is transmitted to the display system 130 by the information distribution unit 205 as necessary. The monitoring information DB 204 may store the information of the camera 111, the GPS sensor 112, the microphone 113, and the CAN sensor 114 mounted on each vehicle, map information of an area managed by the control system 200 (for example, map information of an area where each infrastructure camera 115 is provided), and position information where the infrastructure camera 115 is provided. In addition, the monitoring information DB 204 may further store AI models used by the recognition unit 202 and the alert determination unit 203.

The information distribution unit 205 distributes the environment information received by the information reception unit 201 and the alert information determined by the alert determination unit 203 to the display system 130.

Figure 7:
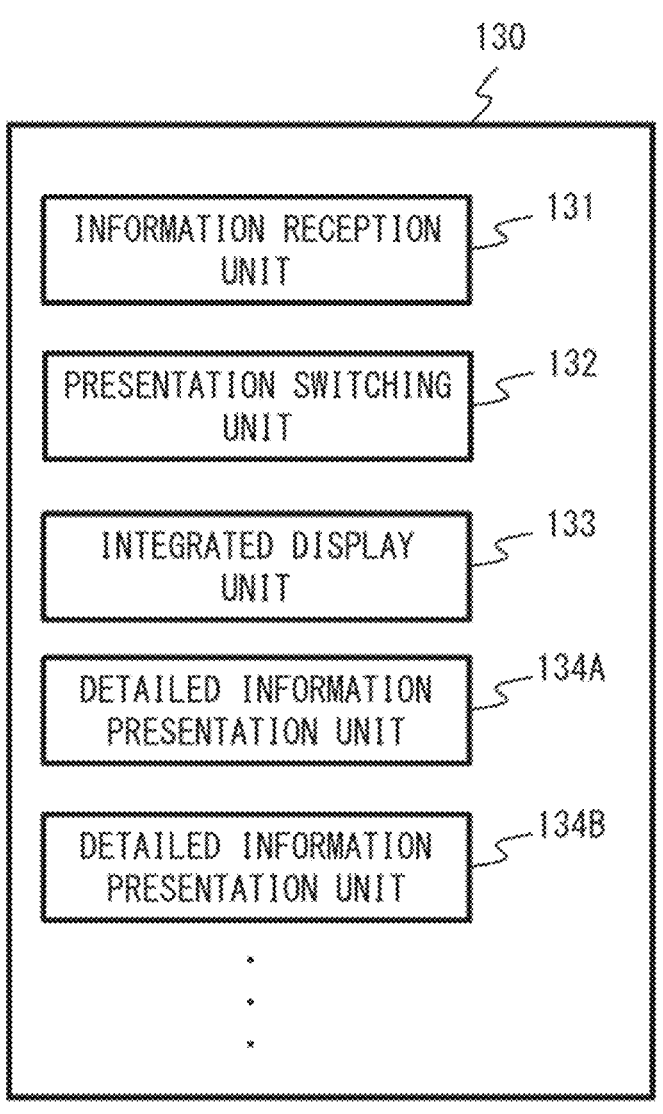
FIG. 7 is a block diagram illustrating an example of a display system according to Example Embodiment 2.

FIG. 7 is a block diagram illustrating an example of the display system 130. The display system 130 receives the environment information from the information distribution unit 205 and presents the information to a surveillance staff. The display system 130 includes an information reception unit 131, a presentation switching unit 132, an integrated display unit 133, and detailed information presentation units 134A, 134B, and the like. The detailed information presentation units 134A and 134B will be collectively referred to as detailed information presentation units 134. Details of each unit will be described below.

The information reception unit 131 receives the environment information and the alert information distributed from the information distribution unit 205. Then, the received information is output to the presentation switching unit 132. Further, at least the video information of the camera 111 among the pieces of environment information distributed from the information distribution unit 205 is output to the integrated display unit 133. However, the environment information other than the video, such as the position information of the GPS sensor 112, may also be output to the integrated display unit 133.

The presentation switching unit 132 analyzes the acquired alert information, and in a case where there is a vehicle for which the alert is set to "Yes", the presentation switching unit 132 switches presentation of the information in such a way that the environment information distributed from the apparatus mounted on the vehicle is output to the detailed information presentation unit 134 and presented. Specifically, the video captured by the camera 111 mounted on the vehicle for which the alert is set to "Yes", the position information detected by the GPS sensor 112, the sound information acquired by the microphone 113, and the vehicle state information acquired by the CAN sensor 114 are output to the detailed information presentation unit 134. In a case where there is a plurality of vehicles for which the alert is set to "Yes", the pieces of environment information of the different vehicles are output to the different detailed information presentation unit 134 in such a way that the vehicles for which the alert is set to "Yes" and the detailed information presentation units 134 are in a one-to-one correspondence.

Further, the presentation switching unit 132 may cause a display unit of the detailed information presentation unit 134 to display not only the video captured by the camera 111 mounted on the vehicle for which the alert is set to "Yes" but also the video captured by the infrastructure camera 115 in a case where there is a video captured by the infrastructure camera 115 that can capture an image of the vehicle.

The integrated display unit 133 collectively displays the videos acquired from the cameras 111 in the plurality of vehicles in real time in a state where the videos are divided for each vehicle. For example, the videos captured by the cameras 111A to 111D of the vehicle A are displayed in one section of the integrated display unit 133, and the videos captured by the cameras 111A to 111D of the vehicle B are displayed in another section. The integrated display unit 133 may further display the video captured by the infrastructure camera 115. The integrated display unit 133 includes, for example, a large-screen display panel.

The detailed information presentation unit 134 is an information presentation unit provided for each of a plurality of surveillance staff, and includes the display unit and a speaker. The videos captured by the cameras 111A to 111D mounted on the vehicle, the position information detected by the GPS sensor 112, and the vehicle state information detected by the CAN sensor 114 are displayed for a specific vehicle on the display unit of the detailed information presentation unit 134 in real time. In addition, the video captured by the infrastructure camera 115 that can capture an image of the specific vehicle may also be displayed on the display unit. Further, a sound detected by the microphone 113 mounted on the vehicle is output from the speaker of the detailed information presentation unit 134. The surveillance staff can grasp a situation of the vehicle and surroundings of the vehicle by visually recognizing the display on the display unit and listening to the sound from the speaker.

Figure 8:
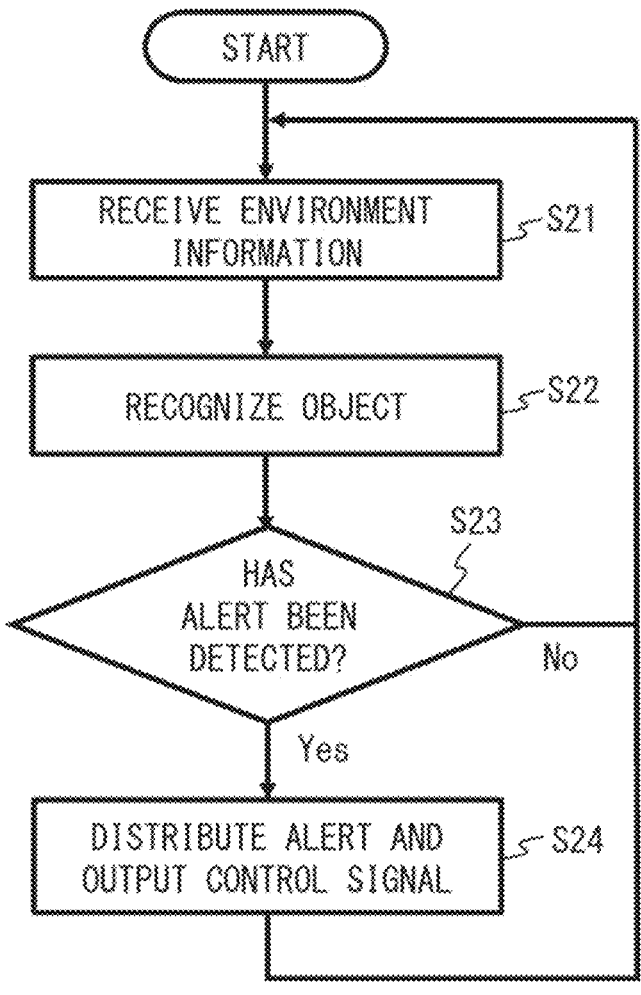
FIG. 8 is a flowchart illustrating an example of processing executed by a control system according to Example Embodiment 2.

FIG. 8 is a flowchart illustrating an example of representative processing in the control system 200, and processing of a control method executed by the control system 200 will be described with the flowchart. The details of processing executed by each unit below are as described above.

The information reception unit 201 receives the environment information such as the video and the position information transmitted from the apparatuses of the on-site system 110 (step S21 (reception step)). The recognition unit 202 identifies, based on the environment information acquired from the information reception unit 201, a region of an object appearing in the videos captured by each camera 111 and each infrastructure camera 115, and specifies the object present in the region (step S22 (recognition step)).

The alert determination unit 203 determines whether or not the alert event has occurred in at least one of the vehicles based on the object recognition result and the environment information (step S23 (detection step)). In a case where the occurrence of the alert event is not detected (No in step S23), the control system 200 returns to step S21 and repeats the processing.

In a case where it is detected that the alert event has occurred in any of the vehicles (Yes in step S23), the alert determination unit 203 generates the alert information and distributes the alert information to the display system 130 via the information distribution unit 205. Further, the alert determination unit 203 outputs the control signal for performing control to change the quality of the transmitted environment information to the apparatus of the on-site system 110 (step S24 (control step)).

When the alert information is distributed, the detailed information presentation unit 134 presents the environment information of the vehicle for which the alert is set to "Yes" to the surveillance staff according to the output from the presentation switching unit 132. At this time, the detailed information presentation unit 134 may also display the fact that the alert event has occurred in the vehicle A on the display unit in text or the like. Furthermore, the detailed information presentation unit 134 may perform display to highlight the region of interest in the video from the camera 111 based on the information regarding the region of interest included in the alert information. As an example, it is conceivable to display a frame line surrounding the region of interest on the display unit.

By confirming the information presented in this manner by the detailed information presentation unit 134, the surveillance staff can take some measures against the vehicle in which the alert has occurred. For example, in a case where the vehicle A during automated driving approaches the stopped vehicle, the surveillance staff visually recognizes the video from the camera 111A that captures the image of the front of the vehicle A, so that the surveillance staff can control the driving of the vehicle A and perform a collision avoidance operation. In addition, in a case where the surveillance staff confirms that an accident has occurred in the vehicle in which the alert has occurred through the video or the like, the surveillance staff can rush to the place where the vehicle is positioned based on the position information of the vehicle displayed on the display unit.

In a case where the alert determination unit 203 of the control system 200 determines that the alert flag is set to "Yes" for a certain vehicle, the monitoring system S2 can execute processing described in the following Example Embodiments 2A to 2F as specific processing of step S24 of FIG. 8. In the following example, it is assumed that the vehicle in which the alert event has occurred is the vehicle A. In addition, the processing described in Example Embodiments 2A to 2F can be applied in appropriate combination.

Example Embodiment 2A

The alert determination unit 203 can transmit a control signal for instructing to enhance the qualities of all the transmitted videos, to all the cameras 111 mounted on the vehicle A via the information reception unit 201. All the cameras 111 mounted on the vehicle A include not only the camera 111 that has captured a video that is the basis for determining that the alert event has occurred but also the camera 111 that has not captured such a video (that is, the camera 111 that is not related to the detection of the occurrence of the alert event).

In a case where the alert event has not occurred, the cameras 111A to 111D transmit videos whose quality can be determined by the AI models in the recognition unit 202 and the alert determination unit 203. However, the quality is poor when viewed by human. Therefore, in a case where the video is transmitted to the display system 130 as it is and the surveillance staff confirms the video with the detailed information presentation unit 134, there is a problem that the surveillance staff cannot make an accurate determination or the surveillance staff may feel uncomfortable or fatigued.

Based on such circumstances, the alert determination unit 203 recognizes all the cameras 111 mounted on the vehicle A with reference to the monitoring information DB 204 with the occurrence of the alert for the vehicle A as a trigger, and transmits the control signal for changing the quality of the video to each camera 111. Each camera 111 transmits, to the cloud 120 and the display system 130, a video with a higher quality than when no alert occurs, based on the control signal. As described above, the presentation switching unit 132 causes the detailed information presentation unit 134 to present the video captured by the camera 111 of the vehicle A in which the alert has occurred. As a result, when the surveillance staff confirms the video of the vehicle A with the detailed information presentation unit 134, it is possible to confirm a high-quality video, so that it is easy to make an accurate determination, and there is an effect that a sense of discomfort and a feeling of fatigue when viewing the video are reduced.

FIG. 9A is a table illustrating examples of video quality (for AI) when the alert has not occurred and video quality (for the surveillance staff) when the alert has occurred, for the video transmitted by the camera 111 of the vehicle A. In this example, a frame rate, a bit rate, and resolution are designated as parameters indicating the video quality. The frame rate, the bit rate, and the resolution are 10 [fps], 0.5 [Mbps], and high definition (HD), respectively, for AI, whereas the frame rate, the bit rate, and the resolution are 30 [fps], 5 [Mbps], and Full HD, respectively, for the surveillance staff, which means that the quality is enhanced. The parameter that changes between the video for AI and the video for the surveillance staff may be at least one of the frame rate, the bit rate, or the resolution. Further, the changing parameter of the quality is not limited to this example.

The alert determination unit 203 may output a control signal for changing the quality of the video to the quality for the surveillance staff only to the camera 111 that has captured the video (the video related to the detection of the occurrence of the alert event) that is the basis for determining that the alert event has occurred, instead of to all the cameras 111 mounted on the vehicle A. Alternatively, the alert determination unit 203 may output such a control signal to the camera 111 that has captured the video that is the basis for determining that the alert event has occurred and the camera 111 that captures an image of an image capturing region close to an image capturing region of the camera 111 that has captured the video that is the basis for determining that the alert event has occurred.

For example, in a case where the alert determination unit 203 determines the occurrence of the alert event based on the video of the front of the vehicle A captured by the camera 111A, the alert determination unit 203 may output a control signal for changing the quality of the video to the quality for the surveillance staff not only to the camera 111A but also to the cameras 111C and 111D that capture the videos of the sides of the vehicle A. As another example, in a case where a region where the alert event has occurred is positioned on a left-front side of the vehicle A (for example, in a case where another vehicle is stopped on the left-front side of the vehicle A), the alert determination unit 203 determines that the cameras 111A and 111D are cameras that can capture images in directions related to the stopped vehicle. Then, the control signal for changing the quality of the video to the quality for the surveillance staff may be output to the cameras 111.

However, as described above, the quality of the transmitted video can be enhanced not only in the camera 111 that has captured the video that is the basis for determining that the alert event has occurred, but also in all the cameras 111 mounted on the vehicle A including the camera 111 that has not captured such a video (that is, the camera 111 that is not related to the detection of the occurrence of the alert). Therefore, the surveillance staff can monitor the vehicle A with higher accuracy.

Example Embodiment 2B

In Example Embodiment 2A, the example of changing the quality of the video captured by the camera 111 mounted on the vehicle A when the alert event has occurred in the vehicle A has been described. However, the cameras whose video quality is to be changed may include not only the camera 111 of the vehicle A but also the infrastructure camera 115.

In a case where the alert event has occurred in the vehicle A, the alert determination unit 203 acquires current position information of the vehicle A stored in the monitoring information DB 204. The position information is transmitted from the GPS sensor 112 of the vehicle A. In addition, the alert determination unit 203 acquires pieces of position information of all the infrastructure cameras 115 connected to the control system 200. Then, the current position information of the vehicle A and position information of the infrastructure camera 115 are compared for each infrastructure camera 115, and it is determined whether or not the infrastructure camera 115 is likely to capture the image of the vehicle A.

For example, the alert determination unit 203 may determine that a predetermined infrastructure camera 115 is likely to capture the image of the vehicle A in a case where a distance between the vehicle A and the infrastructure camera 115 is equal to or smaller than a predetermined distance (that is, the infrastructure camera 115 and the vehicle A are geographically close to each other), and may determine that the infrastructure camera 115 is unlikely to capture the image of the vehicle A in a case where the distance between the vehicle A and the infrastructure camera 115 exceeds the predetermined distance.

In addition, the monitoring information DB 204 may store data indicating the image capturing region or an image capturing direction on a map of each infrastructure camera 115. The alert determination unit 203 determines that the infrastructure camera 115 is likely to capture the image of the vehicle A in a case where the vehicle A is positioned in the image capturing region or in the image capturing direction of the infrastructure camera 115 by using the data of the image capturing region or the image capturing direction of the infrastructure camera 115 determined to be close to the vehicle A. In a case where the vehicle A is not positioned in the image capturing region or in the image capturing direction of the infrastructure camera 115, the alert determination unit 203 determines that the infrastructure camera 115 is unlikely to capture the image of the vehicle A.

Further, the alert determination unit 203 may further refer to the map information stored in the monitoring information DB 204 in a case where the vehicle A is positioned in the image capturing region or in the image capturing direction of the infrastructure camera 115. The alert determination unit 203 determines whether or not the vehicle A is positioned in a blind spot of a building when viewed from the infrastructure camera 115 by using data such as a height and size of the building or the like around the infrastructure camera 115 by referring to the map information. The alert determination unit 203 determines that the infrastructure camera 115 is likely to capture the image of the vehicle A in a case where the vehicle A is not positioned in the blind spot of the building when viewed from the infrastructure camera 115, and determines that the infrastructure camera 115 is unlikely to capture the image of the vehicle A in a case where the vehicle A is positioned in the blind spot.

As described in Example Embodiment 2A, the alert determination unit 203 transmits a control signal for changing the quality of the video to be output to the quality for the surveillance staff, to the infrastructure camera 115 determined to be likely to capture the image of the vehicle A. As a result, the video from the infrastructure camera 115 that can capture the image of the vehicle A has high quality for the surveillance staff, so that the surveillance staff on a display system 130 side can observe the video with high accuracy.

Furthermore, the alert determination unit 203 can also perform the above-described control for the camera 111 mounted on another vehicle such as the vehicle B, C, or the like instead of or in addition to the infrastructure camera 115. Specifically, in a case where the alert event has occurred in the vehicle A, the alert determination unit 203 acquires the current position information of the vehicle A and the vehicle such as the vehicle B, C, or the like stored in the monitoring information DB 204. The position information is transmitted from the GPS sensor 112 mounted on each vehicle. Then, the current position information of the vehicle A and the position information of the vehicle such as the vehicle B, C, or the like are compared for each vehicle, and it is determined whether or not there is another vehicle that is likely to capture the image of the vehicle A.

For example, the alert determination unit 203 may determine, in a case where a distance between the vehicle A and a predetermined vehicle is equal to or smaller than a predetermined distance, that the camera 111 of the predetermined vehicle is likely to capture the image of the vehicle A, and may determine, in a case where the distance between the vehicle A and the predetermined vehicle exceeds the predetermined distance, that the camera 111 of the predetermined vehicle is unlikely to capture the image of the vehicle A.

In addition, the monitoring information DB 204 may store data indicating an image capturing region or an image capturing direction of each vehicle. In a case where the data of the image capturing region or the image capturing direction is mapped on the map information for each camera 111 of a vehicle determined to be close to the vehicle A, and the vehicle A is positioned in the image capturing region or in the image capturing direction, the alert determination unit 203 determines that the camera 111 of the vehicle is likely to capture the image of the vehicle A. In a case where the vehicle A is not positioned in the image capturing region or in the image capturing direction, the alert determination unit 203 determines that the camera 111 of the vehicle is unlikely to capture the image of the vehicle A. In this processing, in the vehicle determined to be close to the vehicle A, the camera 111 whose image capturing direction is a direction in which the vehicle A is positioned is determined to be likely to capture the image of the vehicle A, and a camera 111 whose image capturing direction is not the direction in which the vehicle A is positioned is not determined to be likely to capture the image of the vehicle A.

Further, the alert determination unit 203 may further refer to the map information stored in the monitoring information DB 204 in a case where the vehicle A is positioned in the image capturing region or in the image capturing direction of the camera 111 of another vehicle. The alert determination unit 203 determines whether or not the vehicle A is positioned in a blind spot of a building around the vehicle close to the vehicle A when viewed from the vehicle by using data such as a height and size of the building or the like by referring to the map information. The alert determination unit 203 determines that the camera 111 of the vehicle is likely to capture the image of the vehicle A in a case where the vehicle A is not positioned in the blind spot of the building when viewed from the vehicle, and determines that the camera 111 of the vehicle is unlikely to capture the image of the vehicle A in a case where the vehicle A is positioned in the blind spot.

The alert determination unit 203 transmits a control signal for enhancing the quality of the video to be output from the quality for AI to the quality for the surveillance staff, to the camera 111 of the vehicle determined to be likely to capture the video of the vehicle A. As a result, the surveillance staff on the display system 130 side can perform monitoring with high accuracy by viewing the video from another vehicle.

The alert determination unit 203 may repeatedly perform the above-described determination for the camera 111 of a vehicle different from the vehicle A every predetermined time elapses. As a result, for example, in a case where the vehicle B moves from a position where the image of the vehicle A can be captured to a position where the image of the vehicle A cannot be captured, the alert determination unit 203 determines that the camera of the vehicle B is unlikely to capture the image of the vehicle A by the above-described determination. Then, the quality of the video from the camera 111 can be lowered from the quality for the surveillance staff to the quality for AI. In addition, in a case where there is a vehicle that has moved from a position where the image of the vehicle A cannot be captured to a position where the image of the vehicle A can be captured, the quality of the video captured by the camera 111 mounted on the vehicle can be newly enhanced from the quality for AI to the quality for the surveillance staff.

In addition, the presentation switching unit 132 may perform control in such a way that the video with the quality for the surveillance staff transmitted from the infrastructure camera 115 or the camera 111 mounted on a vehicle other than the vehicle A to the display system 130 via the cloud 120 is displayed on the display unit of the detailed information presentation unit 134 that displays the video captured by the camera 111 of the vehicle A. As a result, the surveillance staff can easily confirm both the video from the in-vehicle camera of the vehicle A and the video of the vehicle A captured from the outside.

Example Embodiment 2C

In Example Embodiments 2A and 2B, the quality of the video controlled by the alert determination unit 203 is set in two levels, one for AI and one for the surveillance staff. However, the quality of the video controlled by the alert determination unit 203 is not limited to two levels for AI and the surveillance staff, and may be set in three or more levels.

FIG. 9B is a table illustrating examples of quality (for AI) of the video when the alert event has not occurred and quality (for detailed AI analysis and the surveillance staff) of the video when the alert event has occurred, for the video transmitted by the camera 111 of the vehicle A. Unlike the setting illustrated in FIG. 9A, in FIG. 9B, setting for detailed AI analysis is set separately from setting for the surveillance staff, as the quality of the video when the alert event has occurred. The frame rate, bit rate, and resolution of the video for the detailed AI analysis are 15 [fps], 2 [Mbps], and Full HD, respectively, and this quality is positioned between that for the AI and that for the surveillance staff.

In a case where the recognition unit 202 and the alert determination unit 203 perform determination using the AI models, it is possible to improve the determination accuracy by enhancing the quality of the video that is a determination target. Therefore, in a case where the alert event has occurred in any of the vehicles, the alert determination unit 203 can output a control signal for enhancing the quality of the video from the quality for AI to the quality for the detailed AI analysis, to the camera 111 that is not a monitoring target of the surveillance staff but is related to the alert event. The camera related to the alert event is, for example, the camera 111 that captures a video of a region close to a region where the alert event has occurred.

For example, in a case where the alert determination unit 203 determines the occurrence of the alert event based on the video of the front of the vehicle A captured by the camera 111A, the alert determination unit 203 enhances the quality of the video captured by the camera 111A from the quality for AI to the quality for the surveillance staff. In addition, the alert determination unit 203 can enhance the qualities of the videos captured by the cameras 111C and 111D from the quality for AI to the quality for the detailed AI analysis. In a case where the region where the alert event has occurred is on the left-front side of the vehicle A, the alert determination unit 203 enhances the qualities of the videos captured by the cameras 111A and 111D of the vehicle A from the quality for AI to the quality for the surveillance staff, for the same reason described in Example Embodiment 2A. Further, the alert determination unit 203 can enhance the qualities of the videos captured by the cameras 111B and 111C from the quality for AI to the quality for the detailed AI analysis. However, as described in Example Embodiment 2A, the qualities of all the videos captured by the cameras 111 mounted on the vehicle A may be enhanced from the quality for AI to the quality for the surveillance staff.

Furthermore, in the above two examples, in a case where it is determined that at least one of the infrastructure camera 115 or the camera 111 mounted on a vehicle different from the vehicle A is likely to capture the image of the vehicle A, the quality of the video captured by the camera may be enhanced from the quality for AI to the quality for the detailed AI analysis. The determination as to whether or not at least one of the infrastructure camera 115 or the camera 111 mounted on a vehicle different from the vehicle A is likely to capture the image of the vehicle A is as described in Example Embodiment 2B.

Furthermore, in a case where the AI model of the alert determination unit 203 has detected the occurrence of the alert event based on the video from the camera whose quality is enhanced to the quality for the detailed AI analysis, the alert determination unit 203 may enhance the quality of the video transmitted by the camera from the quality for the detailed AI analysis to the quality for the surveillance staff.

In a case where the surveillance staff performs monitoring, there is a possibility that the surveillance staff feels uncomfortable or fatigued when viewing the video for monitoring with the quality for AI. However, in a case where the video transmitted from the camera has high quality for monitoring even when the alert event has not occurred, the amount of data transmission from the on-site system 110 is always large, and thus, the cost for the wireless communication itself increases. Furthermore, in a case where the frame rate or resolution of the video to be processed is high, the amount of calculation performed in the processing is proportional to the number of video pixels, and thus the cost of the computer for the video processing increases. This becomes more noticeable as the number of cameras that transmit videos increases.

However, as described in Example Embodiments 2A to 2C, in a case where the alert event that needs to be monitored by the surveillance staff has occurred, the control system 200 can perform control in such a way that a video captured by a camera that is assumed to capture the situation has high quality. As a result, it is possible to improve the accuracy of monitoring by the surveillance staff and reduce the cost for communication at the same time.

For example, in a case where the occurrence of the alert event has been detected by the camera 111A mounted on the vehicle A, the alert determination unit 203 can control each of the cameras 111B to 111D mounted on the vehicle A to enhance the quality of the transmitted video even in a case where the occurrence of the alert event has not been detected based on the video from the camera 111. Specifically, the quality of the video can be enhanced from the quality for AI to the quality for the detailed AI analysis or the surveillance staff. As a result, it is possible to achieve both accurate analysis by the AI model or the surveillance staff and reduction of the communication cost during normal operation.

In addition, in a camera that has captured a video related to detection of occurrence of an alert for a predetermined vehicle, the quality of the transmitted video can be set to the quality for the surveillance staff, and, for example, in a camera that is likely to capture the image of the vehicle even though the camera has captured the video not related to detection of the occurrence of the alert event, the quality of the transmitted video can be set to the quality for the detailed AI analysis. As a result, it is possible to enhance the quality of the video from the camera highly relevant to the alert event that has occurred and to cause the surveillance staff to monitor the video from the camera that has captured the important video. Furthermore, the detailed AI analysis may be possible for cameras that are likely to capture important videos. Furthermore, in a camera that is likely to capture an important video, the quality of the video is not enhanced to have high quality for the surveillance staff at once, so that unnecessary data communication amount can be reduced, and the communication cost can be reduced.

The quality of the video transmitted by the camera before the occurrence of the alert event is detected may be the quality for AI, which is relatively low quality. As a result, the effect of reducing the communication cost can be enhanced.

Furthermore, the camera of which the quality of the video is enhanced to the quality for the detailed AI analysis may be a camera mounted on a vehicle different from the vehicle for which the occurrence of the alert event has been detected, or a camera of which a position is fixed and which can capture the image of the vehicle from the outside. As a result, the vehicle for which the occurrence of the alert event has been detected can be monitored from the outside, and more accurate monitoring can be performed.

In Example Embodiments 2A to 2C, in a case where the alert determination unit 203 determines that the alert flag for the vehicle A has changed from "Yes" to "No", a control signal for instructing to lower the qualities of all the transmitted videos to the quality for AI may be transmitted to the camera 111 of which the quality of the video has been enhanced to the quality for the surveillance staff or the quality for the detailed AI analysis.

In addition, if necessary, the alert determination unit 203 may enhance the quality of the video transmitted from a vehicle for which the occurrence of the alert event has not been detected, from the quality for AI to the quality for the detailed AI analysis, or conversely, may lower the quality of the video from the quality for the detailed AI analysis to the quality for AI.

Example Embodiment 2D

In a case where the alert determination unit 203 has detected the occurrence of the alert event for a specific vehicle, the alert determination unit 203 may change not only the quality of the transmitted video but also the quality of other environment information.

For example, in a case where the alert determination unit 203 has detected the occurrence of the alert event for the vehicle A, the alert determination unit 203 acquires not only information of the camera 111 mounted on the vehicle A but also pieces of information of the GPS sensor 112, the microphone 113, and the CAN sensor 114 by referring to the monitoring information DB 204. Then, as described in Example Embodiment 2A, the alert determination unit 203 transmits a control signal for changing the quality of the video to the camera 111 of the vehicle A. Further, the alert determination unit 203 can transmit a control signal for increasing the transmission frequency of the environment information transmitted by each apparatus to the GPS sensor 112, the microphone 113, and the CAN sensor 114 mounted on the vehicle A.

FIG. 10 is a table illustrating examples of the quality (for AI) when the alert has not occurred and the quality (for the surveillance staff) when the alert has occurred for the pieces of environment information transmitted by the GPS sensor 112, the microphone 113, and the CAN sensor 114 of the vehicle A. In this example, the transmission frequencies of the GPS information which is the position information, the sound information, and the CAN information transmitted by the respective apparatuses are 0.2 [Hz], 32 k [bps], and 1 (Hz) for AI, respectively, and are 10 [Hz], 192 k [bps], and 100 (Hz) for the surveillance staff, respectively, which means that the transmission frequencies are increased.

When the alert determination unit 203 transmits a control signal for increasing the transmission frequency of the environment information from the transmission frequency for AI to the transmission frequency for the surveillance staff to each apparatus of the vehicle A, each apparatus transmits the environment information to the cloud 120 and the display system 130 at the transmission frequency for the surveillance staff. The detailed information presentation unit 134 displays the position information detected by the GPS sensor 112 and the vehicle state information detected by the CAN sensor 114 in real time at the transmission frequency for the surveillance staff. Further, the sound from the microphone 113 is output from the speaker of the detailed information presentation unit 134 at the transmission frequency for the surveillance staff. As a result, since the surveillance staff can more accurately confirm the information regarding the vehicle A, it is possible to perform monitoring with high accuracy. In addition, it is also possible to reduce the data communication amount required when the occurrence of the alert event has not been detected.

The alert determination unit 203 may perform control to increase the transmission frequency not for all of the position information, the sound information, and the CAN information but for at least one of the position information, the sound information, or the CAN information. In addition, the alert determination unit 203 may similarly increase the transmission frequency of the environment information other than the position information, the sound information, and the CAN information.

In addition, if necessary, the alert determination unit 203 may enhance the quality of the environment information other than the video from the vehicle for which the occurrence of the alert event has not been detected, from the quality for AI to the quality for the detailed AI analysis, or conversely, may lower the quality from the quality for the detailed AI analysis to the quality for AI. The transmission frequency for the detailed AI analysis is higher than that for AI and lower than that for the surveillance staff, and is insufficient for monitoring performed by the surveillance staff, but enables more detailed analysis by the AI model. The control enables the control system 200 to perform detailed monitoring. In addition, in a case where the AI model of the alert determination unit 203 has detected the occurrence of the alert event based on the environment information whose quality has been enhanced to the quality for the detailed AI analysis, the alert determination unit 203 may enhance the quality of the environment information transmitted from the vehicle from the quality for the detailed AI analysis to the quality for the surveillance staff.

Example Embodiment 2E

Even in a case where the quality of the video is enhanced to the quality for the surveillance staff by the processing described in Example Embodiment 2A and the like, the alert determination unit 203 may lower the quality of the video in a region other than the region of interest in the video with the lapse of time.

For example, when the alert determination unit 203 detects the occurrence of the alert event based on the video from the camera 111A of the vehicle A, the alert determination unit 203 enhances the quality of the entire video transmitted by the camera 111A from the quality for AI to the quality for the surveillance staff. Thereafter, the alert determination unit 203 transmits a control signal to the camera 111A so as to lower the quality of the transmitted video in the region other than the region of interest with the lapse of time by referring to the information regarding the region of interest included in the alert information regarding the camera 111A.

FIG. 11 is a table illustrating an example in which the bit rate of the video transmitted by the alert determination unit 203 is increased to the bit rate for the surveillance staff and then decreased again to the bit rate for AI. After detecting the occurrence of the alert event, the alert determination unit 203 increases the bit rate of the entire video transmitted from the camera 111A from 0.5 [Mbps] to 5 [Mbps]. Thereafter, a control signal is transmitted to the camera 111A to change the bit rate in the region other than the region of interest to 4 [Mbps] after 2 seconds, 3 [Mbps] after 4 seconds, 2 [Mbps] after 6 seconds, 1 [Mbps] after 8 seconds, and 0.5 [Mbps] after 10 seconds. The camera 111A transmits the video with the quality corresponding to the control signal, so that the surveillance staff visually recognizes the video of which the video quality of the region other than the region of interest is lowered with the lapse of time through the detailed information presentation unit 134.

In order to perform monitoring with high accuracy, it is necessary for the surveillance staff to confirm a high-quality video of the region of interest. However, since it is less necessary to monitor regions other than the region of interest, it is preferable to lower the qualities of the videos of the regions in order to reduce the data communication amount. However, providing the video of the region of interest with the quality for the surveillance staff and providing the video of the region other than the region of interest with the quality for AI from the beginning may make the surveillance staff feel uncomfortable when viewing the video from the camera 111.

In Example Embodiment 2E, in order to solve this problem, the alert determination unit 203 transmits a control signal to the camera 111A to enhance the quality of the entire video captured by the camera 111A, then lower the quality of the video of the region other than the region of interest in the video, and transmit the video. As a result, after the surveillance staff views the entire video with high quality for the surveillance staff, the quality of the video of the region other than the region of interest is lowered, so that it is possible to reduce the discomfort felt by the surveillance staff when monitoring the video.

Furthermore, the alert determination unit 203 can perform setting in such a way that the quality of the video is monotonously lowered with the lapse of time when lowering the quality of the video of the region other than the region of interest. Here, the alert determination unit 203 may monotonically lower the quality of the video by not only lowering the quality discontinuously (stepwise) as in the above-described example, but also continuously lowering the quality. In addition, in a case where the quality of the video is lowered stepwise, an arbitrary method of lowering two or more steps can be applied as the lowering method. As a result, it is possible to reduce the discomfort felt by the surveillance staff when monitoring the video, as compared with a case where the quality of the video in the region other than the region of interest is immediately lowered to the quality for AI. In particular, the less the quality of the video is lowered at one time, the less likely the surveillance staff feels uncomfortable.

The alert determination unit 203 may designate all the regions other than the region of interest as the regions other than the region of interest for which the quality of the video is lowered, or may designate the region of interest and a region other than a predetermined region surrounding the region of interest (in other words, a partial region other than the region of interest).

In addition, the alert determination unit 203 may perform control to decrease at least one of the frame rate, the bit rate, or the resolution from that for the surveillance staff to that for AI, as the quality of the video of the region other than the region of interest, without being limited to the above-described example.

Furthermore, if the alert determination unit 203 lowers the quality of the video of the region other than the region of interest to be lower than the quality for the surveillance staff, the finally lowered quality does not have to be the quality for AI. For example, the alert determination unit 203 may lower the quality of the video of the region other than the region of interest so as to be finally the quality for the detailed AI analysis. As a result, it is possible to perform detailed analysis using the AI model while lowering the quality of the video of the region with low necessity in the video. Therefore, it is easy to detect the occurrence of the alert event in the region other than the region of interest. In a case where the occurrence of the alert event has been detected in the region other than the region of interest, the alert determination unit 203 enhances the quality of the entire video captured by the camera 111A to the quality for the surveillance staff again.

Example Embodiment 2F

In a case where the occurrence of the alert event has been detected for any vehicle, the alert determination unit 203 may transmit a control signal to a camera that has captured a video not related to the detection of the occurrence of the alert to lower the quality of the video transmitted from the camera.

For example, in a case where the alert determination unit 203 has detected the occurrence of the alert event by using the environment information from any apparatus mounted on the vehicle A, the alert determination unit 203 determines a vehicle for which the occurrence of the alert event has not been detected among vehicles other than the vehicle A by referring to information stored in the monitoring information DB 204. Then, in a case where a video transmitted from the camera 111 mounted on the vehicle has the quality for the surveillance staff, the quality of the entire video is lowered to the quality for the detailed AI analysis or AI. Furthermore, in a case where the video transmitted from the camera 111 mounted on the vehicle has the quality for the detailed AI analysis, the alert determination unit 203 lowers the quality of the entire video to the quality for AI. The quality of the video to be lowered is at least one of the frame rate, the bit rate, or the resolution. The present disclosure is not limited to this example, and control for lowering the quality of the entire video may be similarly performed for at least one of the camera 111 of the vehicle or the infrastructure camera

115 determined to be unlikely to capture the image of the vehicle A in the determination described in Example Embodiment 2B.

In addition, for a vehicle for which the occurrence of the alert event has not been detected or a vehicle determined to be unlikely to capture the image of the vehicle A, the alert determination unit 203 can decrease the transmission frequency of the environment information from at least one of the GPS sensor 112, the microphone 113, or the CAN sensor 114 to the transmission frequency for AI in a case where the transmission frequency is the transmission frequency for the surveillance staff.

As described above, in a case where the alert determination unit 203 has detected the occurrence of the alert event, the alert determination unit 203 can transmit a control signal to an apparatus that has transmitted the environment information not related to the detection of the occurrence of the alert event to lower the quality of the transmitted environment information. As a result, it is possible to reduce the data communication amount of information with low necessity of monitoring.

In particular, the alert determination unit 203 can transmit a control signal to an apparatus mounted on a vehicle for which no alert has been detected to lower the quality of the transmitted environment information. As a result, it is possible to reduce the data communication amount from a vehicle with low necessity of monitoring.

Note that the present disclosure is not limited to the above-described example embodiments, and can be appropriately modified without departing from the scope. For example, the quality of the video transmitted from the camera may be changed not only in two or three stages as described in Example Embodiment 2, but also in four or more stages. Furthermore, in Example Embodiment 2, it has been described that uniform numerical values are set for the camera in each setting for AI, for the detailed AI analysis, and for the surveillance staff. However, even in the same setting for AI, detailed AI analysis, or surveillance staff, a numerical value indicating the quality may be set to be different for each camera depending on characteristics (for example, whether the camera is the in-vehicle camera 111 or the infrastructure camera 115) of the camera or a place where the camera is provided. However, in a case where a numerical value indicating the video quality for AI and a numerical value indicating the video quality for the detailed AI analysis are compared between arbitrary cameras for a certain parameter indicating the quality, the latter corresponds to a higher quality. Similarly, in a case where a numerical value indicating the video quality for the detailed AI analysis and a numerical value indicating the video quality for the surveillance staff are compared between arbitrary cameras, the latter corresponds to a higher quality.

In addition, the alert determination unit 203 of the control system 200 can determine not only the presence or absence of the alert but also the level of the alert in a case where the alert event has been detected. For example, in a case where the alert determination unit 203 determines that there is a possibility that an accident occurs in the vehicle A, when the possibility of the occurrence of the accident is less than a predetermined threshold value, or when a time until the occurrence of the accident is equal to or longer than a predetermined threshold value, the alert level can be set to "low". On the other hand, when the possibility of the occurrence of the accident is equal to or higher than the predetermined threshold value or when the time until the occurrence of the accident is shorter than the predetermined threshold value, the alert level can be set to "high". The alert determination unit 203 can determine the level of the alert in this manner, store the level in the monitoring information DB 204 as the alert information, and output the alert information to the display system 130. As a result, the surveillance staff can easily confirm the state of the alert event.

Here, if the alert level is "high", the alert determination unit 203 keeps the quality of the entire video captured by the camera 111 mounted on the vehicle for which the alert has been detected at the quality for the surveillance staff, and if the alert level is "low", the alert determination unit 203 may perform control to gradually lower the quality of the video of the region other than the region of interest in the video as described in Example Embodiment 2E.

In addition, the surveillance staff may operate the detailed information presentation unit 134 to output a control signal for changing the quality of the environment information to the cloud 120. For example, the surveillance staff determines that the occurrence of the alert event in the vehicle A has been canceled by confirming the video or the like displayed on the detailed information presentation unit 134. In this case, the detailed information presentation unit 134 transmits, to the cloud 120, a control signal for lowering the quality of the entire video captured by the camera 111 of the vehicle A from the quality for the surveillance staff to the quality for AI or the quality for detailed AI analysis according to the operation of the surveillance staff. In response to the signal, the alert determination unit 203 outputs an instruction to change the alert flag for the vehicle A from "Yes" to "No" and change the quality of the entire video transmitted by the camera 111 of the vehicle A according to the control signal. As a result, the quality of the video transmitted by the instructed camera 111 is lowered, so that the data communication amount with low necessity can be reduced.

The monitoring system according to the present disclosure can monitor an arbitrary object such as a production line of a factory instead of a vehicle.

In the example embodiments described above, the disclosure has been described as a hardware configuration, but the disclosure is not limited thereto. In the disclosure, the processing (step) in the control apparatus or each apparatus in the monitoring system in each example embodiment described above can be implemented by causing a processor in a computer implementing such an apparatus to execute a computer program.

Figure 12:
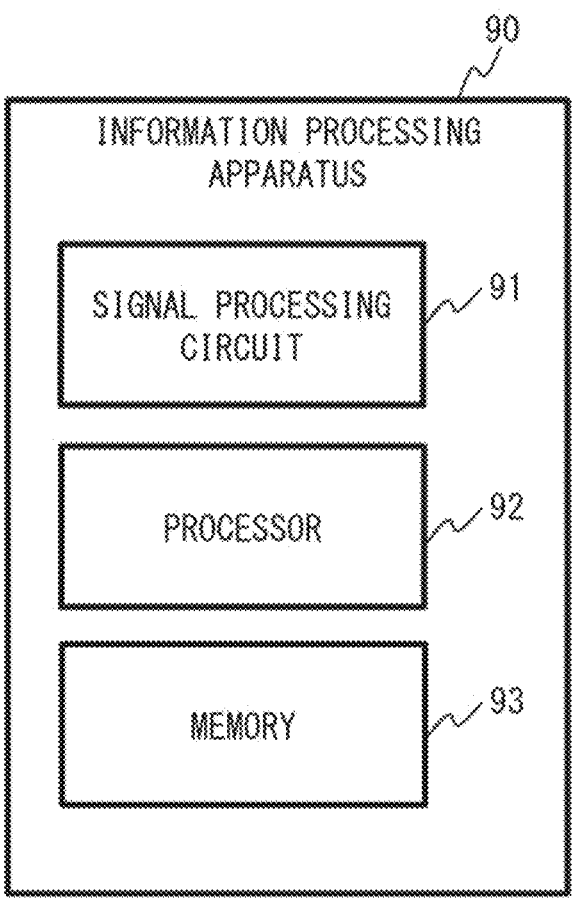
FIG. 12 is a block diagram illustrating an example of a hardware configuration of the apparatus according to each example embodiment.

FIG. 12 is a block diagram illustrating a hardware configuration example of an information processing apparatus (computer) in which the processing in each example embodiment described above is executed. Referring to FIG. 12, an information processing apparatus 90 includes a signal processing circuit 91, a processor 92, and a memory 93. The information processing apparatus 90 implements the control apparatus or each apparatus in the monitoring system.

The signal processing circuit 91 is a circuit for processing a signal under the control of the processor 92. The signal processing circuit 91 may include a communication circuit that receives a signal from a transmission apparatus.

The processor 92 reads software (computer program) from the memory 93 and executes the software to execute the processing in the apparatus described in the above-described example embodiments. The number of processors 92 is not limited to one, and a plurality of processors 92 may be provided. As an example of the processor 92, one of a central processing unit (CPU), a micro processing unit (MPU), a field-programmable gate array (FPGA), a demandside platform (DSP), or an application specific integrated circuit (ASIC) may be used, or a plurality of processors may be used in combination.

The memory 93 includes a volatile memory, a nonvolatile memory, or a combination thereof. The number of memories 93 is not limited to one, and a plurality of memories 93 may be provided. The volatile memory may be, for example, random access memory (RAM) such as dynamic random access memory (DRAM) or static access memory (SRAM). The nonvolatile memory may be, for example, read only memory (ROM) such as programmable read only memory (PROM) or erasable programmable read only memory (EPROM), a flash memory, or a solid state drive (SSD).

The memory 93 is used to store one or more instructions. Here, one or more instructions are stored in the memory 93 as a software module group. The processor 92 can execute the processing described in the above-described example embodiments by reading and executing these software module groups from the memory 93.

Note that the memory 93 may include a memory built in the processor 92 in addition to a memory provided outside the processor 92. The memory 93 may include a storage disposed away from a processor implementing the processor 92. In this case, the processor 92 can access the memory 93 via an input/output (I/O) interface.

As described above, one or a plurality of processors included in each apparatus in the above-described example embodiments executes one or a plurality of programs including an instruction group for causing a computer to execute an algorithm described with reference to the drawings. With this processing, the signal processing method described in each example embodiment can be implemented.

The program includes a group of commands (or software codes) for causing a computer to perform one or more functions that have been described in the example embodiments when the program is read by the computer. The program may be stored in various types of non-transitory computer-readable media or tangible storage media. As an example and not by way of limitation, the computer-readable medium or the tangible storage medium includes random-access memory (RAM), read-only memory (ROM), flash memory, solid-state drive (SSD) or any other memory technology, CD-ROM, digital versatile disk (DVD), Blu-ray (registered trademark) disc or any other optical disk storage, magnetic cassette, magnetic tape, magnetic disk storage, and any other magnetic storage device. The program may be transmitted on a transitory computer-readable medium or a communication medium. By way of example, and not limitation, transitory computer-readable or communication media include electrical, optical, acoustic, or other forms of propagated signals.

Some or all of the above-described example embodiments may be described as in the following Supplementary Notes, but are not limited to the following Supplementary Notes.

(Supplementary Note 1)

A control apparatus including:

detection means for detecting, based on environment information transmitted from a plurality of information acquisition apparatuses that acquires the environment information, whether or not a notable event, which is an event to be noted, has occurred around any of the information acquisition apparatuses; and instruction means for outputting, in a case where the detection means has detected the occurrence of the notable event, an instruction to a first information acquisition apparatus to change quality of the environment information transmitted by the first information acquisition apparatus that has transmitted the environment information not related to the detection of the occurrence of the notable event.

(Supplementary Note 2)

The control apparatus according to Supplementary Note 1, in which the plurality of information acquisition apparatuses is apparatuses mounted on the same vehicle, and the instruction means outputs, in a case where the detection means has detected the occurrence of the notable event, the instruction to the first information acquisition apparatus to enhance the quality of the environment information transmitted by the first information acquisition apparatus.

(Supplementary Note 3)

The control apparatus according to Supplementary Note 1, in which the instruction means outputs, in a case where the detection means has detected the occurrence of the notable event for a predetermined vehicle, the instruction to the first information acquisition apparatus that is likely to capture an image of the predetermined vehicle to enhance quality of a video that is the environment information transmitted by the first information acquisition apparatus.

(Supplementary Note 4)

The control apparatus according to Supplementary Note 1, in which the instruction means outputs, in a case where the detection means has detected the occurrence of the notable event for a predetermined vehicle, the instruction to the first information acquisition apparatus that is likely to capture an image of the vehicle to change quality of a video that is the environment information transmitted by the first information acquisition apparatus from a first quality to a second quality higher than the first quality, and to a second information acquisition apparatus that has transmitted the video that is the environment information related to the detection of the occurrence of the notable event to change quality of a video transmitted by the second information acquisition apparatus from a third quality to a fourth quality higher than the second quality and the third quality.

(Supplementary Note 5)

The control apparatus according to Supplementary Note 4, in which the first information acquisition apparatus is an apparatus mounted on a vehicle different from a vehicle on which the second information acquisition apparatus is mounted, or an apparatus of which a position is fixed and which is configured to capture the vehicle on which the second information acquisition apparatus is mounted from an outside.

(Supplementary Note 6)

The control apparatus according to Supplementary Note 2, in which the first information acquisition apparatus is an apparatus that acquires at least one of sound information, state information of the vehicle, or position information of the vehicle as the environment information, and the instruction means outputs, in a case where the detection means has detected the occurrence of the notable event, the instruction to the first information acquisition apparatus to increase a transmission frequency of the environment information transmitted by the first information acquisition apparatus.

(Supplementary Note 7)

The control apparatus according to any one of Supplementary Notes 1 to 6, in which the instruction means outputs, in a case where the detection means has detected the occurrence of the notable event, the instruction to a second information acquisition apparatus that has transmitted a video that is the environment information related to the detection of the occurrence of the notable event to transmit the video after enhancing quality of the entire video transmitted by the second information acquisition apparatus and then lowering quality of a video of at least a partial region other than a region related to the occurrence of the notable event in the video.

(Supplementary Note 8)

The control apparatus according to Supplementary Note 7, in which the instruction means performs setting in such a way that the quality of the video of the partial region is monotonously lowered with a lapse of time when lowering the quality of the video of the partial region.

(Supplementary Note 9)

The control apparatus according to Supplementary Note 1, in which the instruction means outputs, in a case where the detection means has detected the occurrence of the notable event, the instruction to the first information acquisition apparatus to lower the quality of the environment information transmitted by the first information acquisition apparatus.

(Supplementary Note 10)

The control apparatus according to Supplementary Note 9, in which the first information acquisition apparatus is an apparatus mounted on a vehicle, and is mounted on a vehicle different from a vehicle on which a second information acquisition apparatus that has transmitted the environment information related to the detection of the occurrence of the notable event is mounted.

(Supplementary Note 11)

A monitoring system including:

a plurality of information acquisition apparatuses configured to acquire environment information and transmit the acquired environment information; and a control apparatus configured to control the transmission of the environment information of the plurality of information acquisition apparatuses based on the environment information transmitted from the plurality of information acquisition apparatuses, in which the control apparatus includes:

detection means for detecting, based on the environment information transmitted from the plurality of information acquisition apparatuses, whether or not a notable event, which is an event to be noted, has occurred around any of the information acquisition apparatuses; and instruction means for outputting, in a case where the detection means has detected the occurrence of the notable event, an instruction to a first information acquisition apparatus to change quality of the environment information transmitted by the first information acquisition apparatus that has transmitted the environment information not related to the detection of the occurrence of the notable event.

(Supplementary Note 12)

The monitoring system according to Supplementary Note 11, in which the plurality of information acquisition apparatuses is apparatuses mounted on the same vehicle, and the instruction means outputs, in a case where the detection means has detected the occurrence of the notable event, the instruction to the first information acquisition apparatus to enhance the quality of the environment information transmitted by the first information acquisition apparatus.

(Supplementary Note 13)

A control method executed by a control apparatus, the control method including:

detecting, based on environment information transmitted from a plurality of information acquisition apparatuses that acquires the environment information, whether or not a notable event, which is an event to be noted, has occurred around any of the information acquisition apparatuses; and outputting, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

(Supplementary Note 14)

A non-transitory computer-readable medium storing a program for causing a computer to perform:

detecting, based on environment information transmitted from a plurality of information acquisition apparatuses that acquires the environment information, whether or not a notable event, which is an event to be noted, has occurred around any of the information acquisition apparatuses; and outputting, in a case where the occurrence of the notable event has been detected, an instruction to a first information acquisition apparatus to change quality of the environment information transmitted by the first information acquisition apparatus that has transmitted the environment information not related to the detection of the occurrence of the notable event.

Although the present disclosure has been described above with reference to the example embodiments, the present disclosure is not limited to the above. Various modifications that could be understood by those skilled in the art can be made to the configuration and details of the present disclosure within the scope of the disclosure.

REFERENCE SIGNS LIST

10 CONTROL APPARATUS
11 DETECTION UNIT
12 INSTRUCTION UNIT
S1 MONITORING SYSTEM
21 INFORMATION ACQUISITION APPARATUS
22 CONTROL APPARATUS
S2 MONITORING SYSTEM
110 ON-SITE SYSTEM
111 CAMERA
112 GPS SENSOR
113 MICROPHONE
114 CAN SENSOR
115 INFRASTRUCTURE CAMERA
120 CLOUD
130 DISPLAY SYSTEM
131 INFORMATION RECEPTION UNIT
132 PRESENTATION SWITCHING UNIT
133 INTEGRATED DISPLAY UNIT
134 DETAILED INFORMATION PRESENTATION UNIT
200 CONTROL SYSTEM
201 INFORMATION RECEPTION UNIT
202 RECOGNITION UNIT
203 ALERT DETERMINATION UNIT
204 MONITORING INFORMATION DB
205 INFORMATION DISTRIBUTION UNIT

What is claimed is:

1. A control apparatus comprising:

at least one memory storing instructions; and at least one processor configured to execute the instructions to:

detect, based on environment information transmitted from a plurality of information acquisition apparatuses that acquires the environment information, whether or not a notable event has occurred around any of the information acquisition apparatuses, the notable event being an event to be noted; and output, in a case where the occurrence of the notable event for a vehicle has been detected, an instruction to a first information acquisition apparatus to change quality of a video transmitted by the first information acquisition apparatus from a first quality to a second quality higher than the first quality, and to a second information acquisition apparatus to change quality of a video transmitted by the second acquisition apparatus from a third quality to a fourth quality higher than the third quality, the first information acquisition apparatus being likely to capture an image of the vehicle, the video transmitted by the first information acquisition apparatus being the environment information not related to the detection of the occurrence of the notable event, the video transmitted by the second information acquisition apparatus being the environment information related to the detection of the occurrence of the notable event.

2. The control apparatus according to claim 1, wherein the plurality of information acquisition apparatuses is apparatuses mounted on the same vehicle, and the at least one processor is further configured to output, in a case where the occurrence of the notable event has been detected, the instruction to the first information acquisition apparatus to enhance the quality of the environment information transmitted by the first information acquisition apparatus.

3. The control apparatus according to claim 2, wherein the first information acquisition apparatus is an apparatus that acquires at least one of sound information, state information of the vehicle, or position information of the vehicle as the environment information, and the at least one processor is further configured to output, in a case where the occurrence of the notable event has been detected, the instruction to the first information acquisition apparatus to increase a transmission frequency of the environment information transmitted by the first information acquisition apparatus.

4. The control apparatus according to claim 1, wherein the at least one processor is further configured to output, in a case where the occurrence of the notable event for a predetermined vehicle has been detected, the instruction to the first information acquisition apparatus that is likely to capture an image of the predetermined vehicle to enhance quality of a video that is the environment information transmitted by the first information acquisition apparatus.

5. The control apparatus according to claim 1, wherein the fourth quality is higher than the second quality.

6. The control apparatus according to claim 1, wherein the first information acquisition apparatus is an apparatus mounted on a vehicle different from a vehicle on which the second information acquisition apparatus is mounted, or an apparatus of which a position is fixed and which is configured to capture the vehicle on which the second information acquisition apparatus is mounted from an outside.

7. The control apparatus according to claim 1, wherein the at least one processor is further configured to output, in a case where the occurrence of the notable event has been detected, the instruction to a second information acquisition apparatus that has transmitted a video that is the environment information related to the detection of the occurrence of the notable event to transmit the video after enhancing quality of the entire video transmitted by the second information acquisition apparatus and then lowering quality of a video of at least a partial region other than a region related to the occurrence of the notable event in the video.

8. The control apparatus according to claim 7, wherein the at least one processor is further configured to perform setting in such a way that the quality of the video of the partial region is monotonously lowered with a lapse of time when lowering the quality of the video of the partial region.

9. The control apparatus according to claim 1, wherein the at least one processor is further configured to output, in a case where the occurrence of the notable event has been detected, the instruction to the first information acquisition apparatus to lower the quality of the environment information transmitted by the first information acquisition apparatus.

10. The control apparatus according to claim 9, wherein the first information acquisition apparatus is an apparatus mounted on a vehicle, and is mounted on a vehicle different from a vehicle on which a second information acquisition apparatus that has transmitted the environment information related to the detection of the occurrence of the notable event is mounted.

11. A control method executed by a control apparatus, the control method comprising:

detecting, based on environment information transmitted from a plurality of information acquisition apparatuses that acquires the environment information, whether or not a notable event, which is an event to be noted, has occurred around any of the information acquisition apparatuses, the notable event being an event to be noted; and outputting, in a case where the occurrence of the notable event for a vehicle has been detected, an instruction to a first information acquisition apparatus to change quality of a video transmitted by the first information acquisition apparatus from a first quality to a second quality higher than the first quality, and to a second information acquisition apparatus to change quality of a video transmitted by the second acquisition apparatus from a third quality to a fourth quality higher than the third quality, the first information acquisition apparatus being likely to capture an image of the vehicle, the video transmitted by the first information acquisition apparatus being the environment information not related to the detection of the occurrence of the notable event, the video transmitted by the second information acquisition apparatus being the environment information related to the detection of the occurrence of the notable event.

12. A non-transitory computer-readable medium storing a program for causing a computer to perform:

detecting, based on environment information transmitted from a plurality of information acquisition apparatuses that acquires the environment information, whether or not a notable event, which is an event to be noted, has occurred around any of the information acquisition apparatuses, the notable event being an event to be noted; and outputting, in a case where the occurrence of the notable event for a vehicle has been detected, an instruction to a first information acquisition apparatus to change quality of a video transmitted by the first information acquisition apparatus from a first quality to a second quality higher than the first quality, and to a second information acquisition apparatus to change quality of a video transmitted by the second acquisition apparatus from a third quality to a fourth quality higher than the third quality, the first information acquisition apparatus being likely to capture an image of the vehicle, the video transmitted by the first information acquisition apparatus being the environment information not related to the detection of the occurrence of the notable event, the video transmitted by the second information acquisition apparatus being the environment information related to the detection of the occurrence of the notable event.

* * * * *